Figure 1:
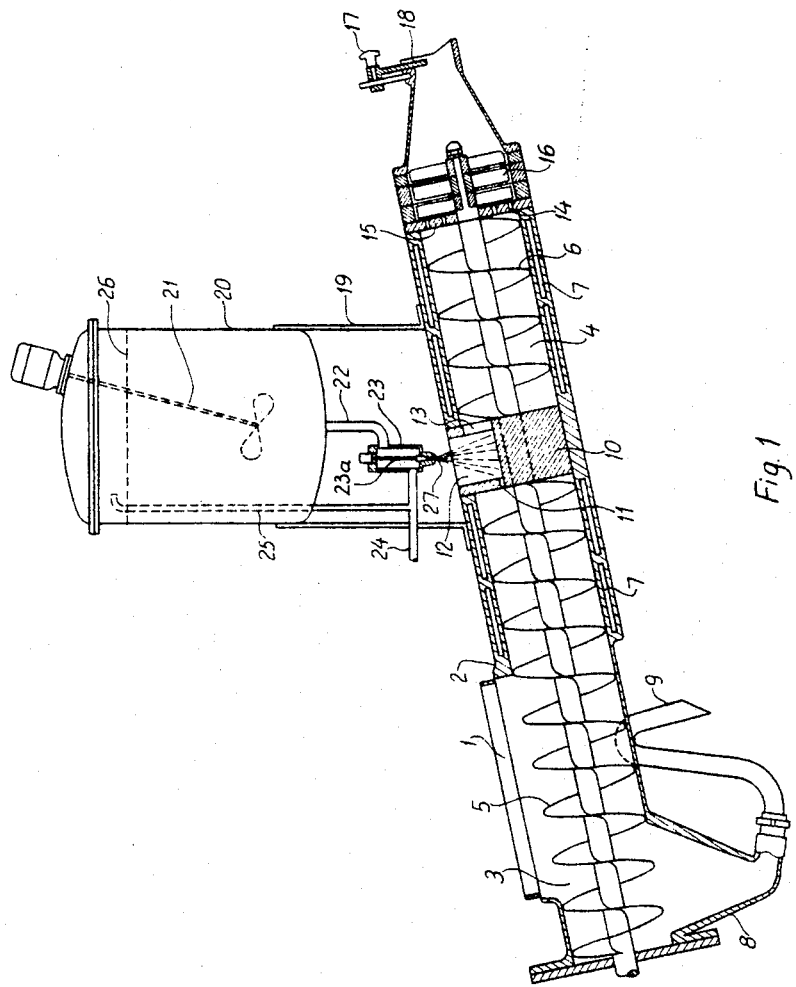

Aug. 23, 1966  C. B. SJÖHOLM ETAL  3,268,341
METHOD OF SALTING BUTTER
Filed Oct. 15, 1964   2 Sheets-Sheet 1

INVENTORS
Claes Bertil Sjöholm
Karl Johan Georg Mårtensson
BY Kurt Malte Holmgren
Davis, Hoxie, Faithfull & Hapgood
Attorneys Aug. 23, 1966     C. B. SJÖHOLM ETAL     3,268,341
METHOD OF SALTING BUTTER Filed Oct. 15, 1964     2 Sheets-Sheet 2

INVENTORS
Claes Bertil Sjöholm,
Karl Johan Georg Mårtensson
BY Kurt Malte Holmgren Davis, Hoxie, Faithfull & Hapgood
Attorneys

United States Patent Office 3,268,341
Patented August 23, 1966

3,268,341
METHOD OF SALTING BUTTER
Claes Bertil Sjöholm, Malmo, Karl J. G. Mårtensson, Lund, and Malte Kurt Holmgren, Malmo, Sweden, assignors to Aktiebolaget Separator, Stockholm, Sweden, a corporation of Sweden
Filed Oct. 15, 1964, Ser. No. 405,025
7 Claims. (Cl. 99—119)

This application is a continuation-in-part of our copending application Serial No. 188,101, filed April 17, 1962, now abandoned.

This invention relates to a method of salting butter, margarine, or other similar substances.

In the production of butter and similar products, it is often desirable to introduce salt into the mixture. One method used heretofore is to add dry salt to the product. This has the disadvantage of distributing solid particles of salt in the mixture as it is kneaded, thereby requiring an extended period to dissolve the salt in the water content of the butter. In so dissolving, the salt particles attract water from adjacent parts of the mixture, resulting in non-uniform distribution of the brine. This, in turn, creates non-uniformity of color and impairs the keeping quality of the butter. In addition, the butter liberates free brine when the butter is spread, producing an undesirable quality. Fine grinding of the salt has been attempted but this does not eliminate the problem. The more finely the salt is ground the more easily it becomes caked and thus the more difficult it becomes to obtain a sufficiently uniform distribution of the salt in the butter.

It would be possible to avoid these disadvantages by adding brine to the butter instead of dry salt. However, this method allows only a relatively weak salting of the butter since the maximum salt concentration in brine is about 25 percent by weight. Thus, an addition of 1% of salt in this manner entails a simultaneous addition of 3% of water, which means that if sufficient salting is to be effected, the unsalted butter must have an unusually low water content in order to maintain the water content of the final product within the required limits. In most cases it is impossible to produce a butter having such a low water content.

The principal object of the present invention is to provide a method for introducing salt into butter or a like substance in a substantially uniform distribution and with a minimum amount of added water.

According to the present invention, a mixture of water and undissolved salt having a maximum grain size of .05 mm. is supplied to and worked into the butter or margarine. A preferred embodiment employs a mixture of brine (water saturated with common salt) and solid salt, but in any event the mixture contains between 35 and 95 percent of salt calculated by weight. Preferably 50 percent by weight of salt is used. This provides only a one percent rise in water content for each one percent of salt added, thereby easily allowing the water content to remain within the maximum permissible limits, and at the same time it allows easy pumping of the mixture to incorporate it in the butter. In fact, the pumping may be still further facilitated, while retaining the advantages of the present invention, by using a mixture of water and undissolved salt having only 35% of salt calculated by weight.

If the salt is thus added in the form of a suspension of salt in water, at least 10 percent of the mixture should be water to provide sufficient fluidity to the mixture. According to another embodiment, fine dry salt is added to the butter by means of a stream or jet of water, in which case the water addition should be at least 5 percent of the salt addition, by weight.

The method of this invention is adapted for continuous butter manufacture, and the quantity of salt introduced can be co-related to the flow rate of the butter to produce the desired percentage of salt.

Figure 2:
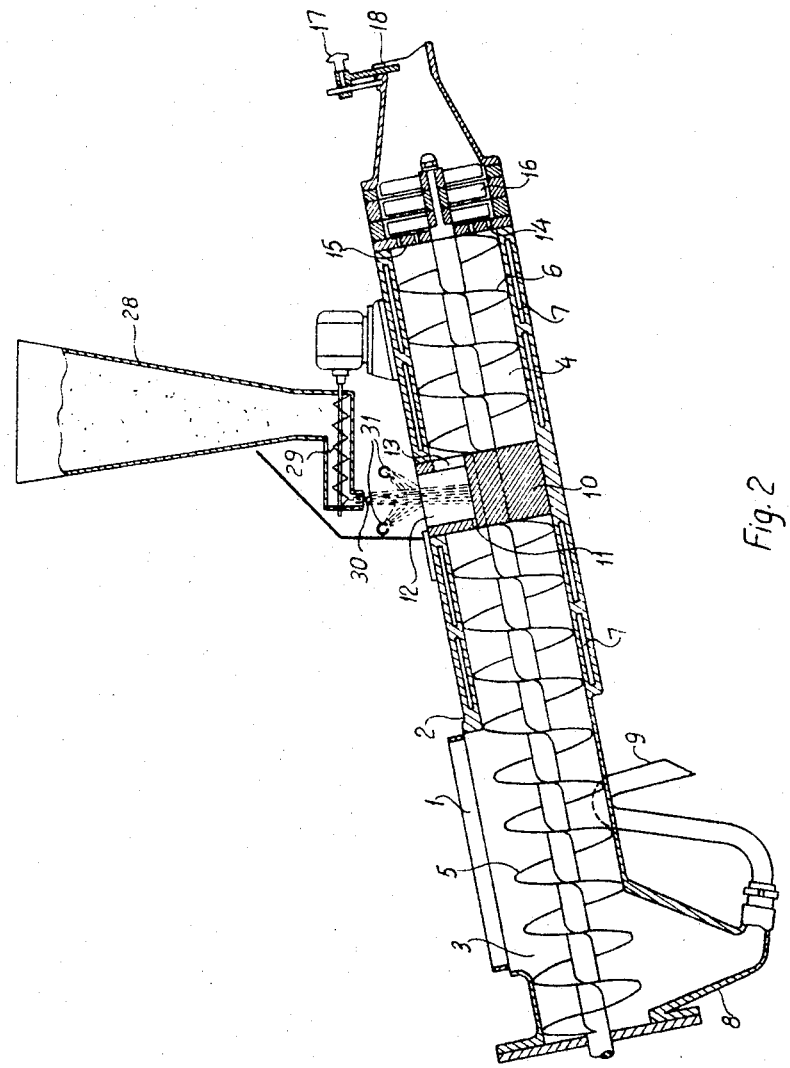

The invention is described in greater detail below, with reference to the accompanying drawings in which:

FIG. 1 is a longitudinal, vertical section through one embodiment of an apparatus for carrying out the method, and FIG. 2 is a longitudinal, vertical section through a second embodiment of the apparatus.

Referring to FIG. 1, a mixture of buttermilk and butter grains enters a continuous butter making machine 2 through opening 1 in chamber 3. This machine comprises the chamber 3 where buttermilk is separated from the butter grains, and a chamber 4 where added salt is worked into the butter. The chambers 3 and 4 are inclined upwardly from inlet 1.

The chambers 3 and 4 are provided with screw sections 5 and 6, respectively, of a common conveyor screw, and a similar conveyor screw (not shown) is located in these chambers beside the screws 5–6 in the same horizontal plane. These two screws are rotatably driven in opposite directions in any suitable manner so that the butter is fed in towards the space between the screws while travelling to the right in FIG. 1, such parallel conveyor screws being well known in the art.

The chambers 3 and 4 are cooled by means of cooling jackets 7, which may be supplied with ice water. Buttermilk separated in the chamber 3 by means of the screws 5 is accumulated in a funnel 8 situated at the lower end of the inclined chamber and flows from this funnel over an overflow which is formed by a bent pipe 9. Between the chambers 3 and 4 is a partition wall 10 with a substantially central slot 11 having a width of 10 to 15 cm. in the horizontal direction. Through this slot a correspondingly broad ribbon of butter is extruded by means of the screws 5. This ribbon passes through a space 12 in the wall 10 and thence through an opening 13 leading into the chamber 4, where it is caught by the screws 6. The latter feed the butter onward through openings 14 in a wall 15 into a kneading member provided with vanes 16. The counterpressure against which the butter is discharged from the machine is controlled by means of a throttling gate 18 which is adjustable by an adjusting screw 17.

A frame 19 of the machine supports a container 20 for salt sludge, that is, a mixture of finely ground salt and brine. The container is provided with an agitator 21 so as to keep the salt sludge homogeneously mixed. The salt sludge is discharged from the bottom of the container through an outlet duct 22 which opens into a needle valve 23. A compressed air pipe 24 also opens into this valve, and another pipe 25 is branched off from pipe 24 and opens into a space above the liquid level 26 in the container 20, thereby keeping this space under the same pressure as that in the pipe 24. The rate of supply of salt sludge to the butter ribbon in the chamber 12 is controlled by screwing the valve element 23a of needle valve 23 up or down to the desired position so that the valve opening 27 discharges the salt sludge at the desired rate. The salt sludge is entrained by the compressed air rushing out through valve opening 27 and is thereby distributed over the ribbon of butter in the underlying space 12.

In FIG. 2, finely ground salt is discharged from a container 28 by means of a motor-driven conveyor screw 29, from which it passes at the desired rate through an opening 30 and falls onto the butter ribbon in the space 12. The salt is moistened on its way down to the butter ribbon by means of jets of water from supply tubes 31, these jets impinging on the falling stream of salt and supplying the water at the desired rate in relation to the rate of salt feed and the rate of butter feed through space 12.

We claim:
1. A method for salting butter and margarine products, which comprises supplying to the product a mixture of water and undissolved salt grains having a maximum grain size of 0.05 mm., said mixture containing from 35 to 95% of salt by weight and containing the water in an amount which is at least 5% of the salt by weight, and working said mixture into the butter.
2. The method of claim 1, in which said mixture consists of brine and said salt grains.
3. The method of claim 1, in which said mixture is supplied by entraining the salt grains in a stream of the water and contacting said stream with the product promptly after said entraining.
4. The method of claim 1, in which said mixture contains about 50% of salt by weight.
5. The method of claim 1, in which said mixture contains at least 10% of water and is prepared in the form of a suspension of salt in water before supplying the mixture to the product.
6. The method of claim 1, comprising also feeding a mass of the product continuously to and through a working zone and there effecting said working continuously, said mixture being supplied continuously to the product prior to completion of said working.
7. The method of claim 1, comprising also feeding a mass of the product continuously to and through a working zone and there effecting said working continuously, and extruding the product into a ribbon as it is fed to said zone, said mixture being supplied continuously to the ribbon.

References Cited by the Examiner
UNITED STATES PATENTS
2,649,377  8/1953  Wilsmann _____ 99—119

OTHER REFERENCES

Fouts et al.: Dairy Manufacturing Processes, publ. by John Wiley & Sons, Inc., N.Y., 1948, pp. 194 and 195.

Hunziker: The Butter Industry, publ. by author, La Grange, Ill., 1940, pp. 443 and 444.

McDowall: The Buttermaker's Manual, vol. I, publ. by New Zealand University Press, Wellington, 1953, pp. 432, 433 and 713.

A. LOUIS MONACELL, *Primary Examiner.*

M. W. GREENSTEIN, *Assistant Examiner.*